July 8, 1952  G. E. PARKER  2,602,654
GOVERNOR
Filed June 24, 1948  2 SHEETS—SHEET 1

INVENTOR
George E. Parker
ATTORNEY

July 8, 1952          G. E. PARKER          2,602,654
GOVERNOR
Filed June 24, 1948                    2 SHEETS—SHEET 2
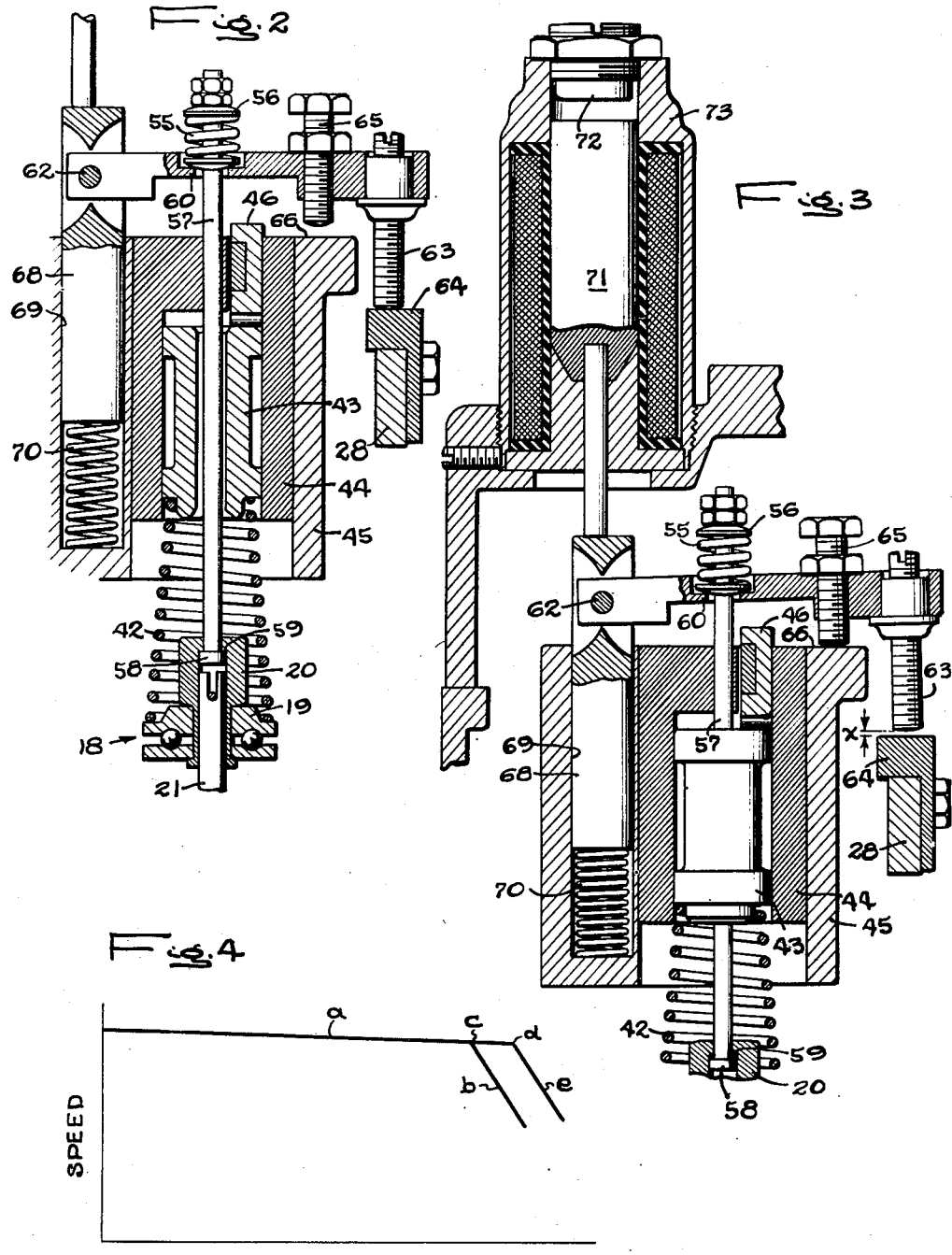
INVENTOR
George E. Parker
ATTORNEY Patented July 8, 1952

2,602,654

UNITED STATES PATENT OFFICE 2,602,654

GOVERNOR

George E. Parker, Rockford, Ill., assignor to Woodward Governor Company, Rockford, Ill., a corporation of Illinois Application June 24, 1948, Serial No. 34,861

9 Claims. (Cl. 264—4)

1

This invention relates to a speed responsive governor having a so-called speed droop characteristic for stabilizing the operation of a prime mover controlled by the governor. More particularly, the invention relates to a speed droop governor in which the amount of speed droop is varied in value in different parts of the governor operating range.

One object is to provide a governor of the above character in which the droop may be changed by a substantial amount in one part of the operating range without danger of causing unstable operation of the controlled prime mover and without changing the sensitivity of the governor in other parts of the operating range.

A more detailed object is to preclude danger of self-excited oscillations in the governor by automatically changing the scale of the governor speed control spring in accordance with desired change in the amount of droop in the governor.

Another object is to provide for changing the governor speed droop along different curves within the same portion of the operating range of the governor.

Other objects and advantages of the invention will become apparent from the following detailed description taken in connection with the accompanying drawings, in which Figure 1 is a vertical sectional view of the improved governor with the main operating parts rearranged and shown in a common plane.

Figs. 2 and 3 are fragmentary views showing certain of the parts in different operating positions.

Fig. 4 is a graph of the speed droop characteristic of the governor.

Figure 1:
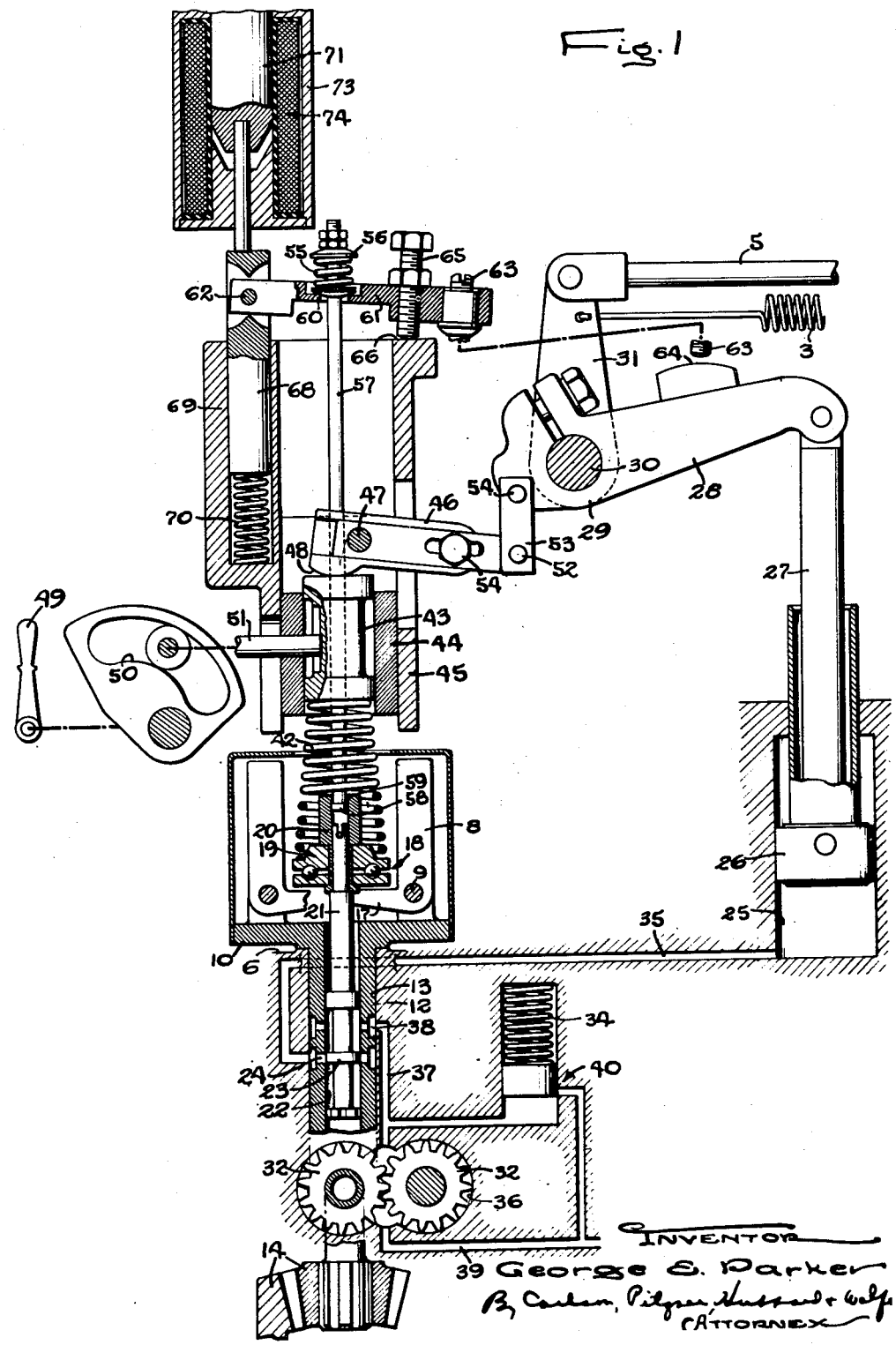

While the invention is susceptible of various modifications and alternative constructions, I have shown in the drawings and will herein describe in detail the preferred embodiment. It is to be understood, however, that I do not intend to limit the invention by such disclosure, but aim to cover all modifications and alternative constructions falling within the spirit and scope of the invention as expressed in the appended claims.

The improved speed droop governor is especially suited for use in imparting to a prime mover a speed droop characteristic $a$ (Fig. 4) of low value, for example 5%, during the normal range of operation of the prime mover controlled by the governor, and a substantially greater droop $b$ above a given load which is indicated at $c$. The invention also contemplates selective adjustment of the governor to shift the load limit $c$ for example to higher point $d$ and then increase the amount of the speed droop as indicated at $e$.

2

The governor shown in the drawings for purposes of illustration is intended to detect changes in the speed of a prime mover (not shown) and to correct for such changes by positioning a speed regulating member such as a rod 5 controlling the supply of energy or fuel to the prime mover. Herein, the rod is movable to the left from the idling position shown in Fig. 1 to progressively increase the fuel supply. A spring 3 acts on the rod to urge the latter in the speed decreasing direction.

The speed sensing device and the servo controlled thereby may be housed in a casing indicated generally at 6 and usually mounted on some part of the prime mover housing. While the speed sensing device may take various forms, it is shown herein as comprising upstanding weights or flyballs 8 pivoted on horizontal pins 9 on a head 10 fast on the upper end of a sleeve 12 which is journaled in a vertical bore 13 of the casing 6 with its lower end driven through suitable gears 14 from a shaft on the prime mover.

Arms 17 on the flyballs bear upwardly against the lower race ring of a ball thrust bearing 18 having an upper ring 19 which abuts against a head 20 on the upper end of a valve rod 21. The latter is slidable in a bore 22 of the sleeve 12 and carries an enlargement or land 23 at its lower end cooperating with sleeve ports 24 of substantially the same diameter as the length of the land. The valve thus formed controls the flow of pressure fluid or oil through a groove around the sleeve to and from a passage 35 leading to the head end of a cylinder 25 in the casing 6.

A piston 26 reciprocates in this cylinder and cooperates therewith to form a servo motor for variably positioning the throttle rod 5 or other device by which the speed of the prime mover is regulated. Herein, the rod 27 of the piston is connected to the long arm 28 of a bell crank 29 pivoted at 30 on the governor casing 6. The fuel rod 5 is pivoted on a shorter arm 31 of the bell crank.

Gears 32 one of which is driven by the sleeve 12 are mounted in a recess 36 of the casing to form a pump whose outlet delivers pressure fluid to a passage 37 leading through a groove 38 to the interior of the valve sleeve 12 above the control land 23. When the supply line pressure exceeds a predetermined value determined by a spring 34, fluid is by-passed through a valve 40 to the pump inlet 39 which also communicates with the oil supply line of the prime mover.

The tendency of the flyballs to lift the pilot valve rod 21 is counteracted in the present instance by a resilient means in the form of a coiled compression spring 42 acting between the upper bearing race 19 and a plug 43 which is slidable endwise in a sleeve 44 movable in a guide 45 in the casing 6. For a purpose to appear presently, the plug 43 is connected to the sleeve 44 through the medium of a lever 46 fulcrumed intermediate its ends on a pin 47 fixed to the sleeve but offset from the axis of the plug. A rounded surface 48 on the short end of the lever bears downwardly against the plug which therefore moves with the sleeve but is movable relative thereto in response to rocking of the lever. By manually adjusting a hand lever 49, a cam 50 may be rocked to raise or lower a pin 51 rigid with the sleeve 44 thereby correspondingly shifting the plug 43 to vary the loading of the flyballs 8 by the main speeder spring 42. In this way, the speed setting of the governor may be varied at will.

To stabilize the operation of the prime mover, the action of the governor is modified to produce a well-known speed droop characteristic $a$, this being accomplished herein by changing the stress in the speeder spring 42 with changes in the position of the servo piston 26. To this end, the longer end portion of the lever 46 is pivotally connected at 52 to a link 53 which is pivoted at 54 on a short arm of the servo actuated bell crank 29. Thus, the lever is moved progressively back and forth with the servo piston 26. As the fuel rod 5 is moved to the right to decrease the fuel supply, the lever 46 is swung counterclockwise about its fulcrum 47 thereby shifting the plug 43 downwardly to compress the spring 42 and thus increase the loading of the flyballs. Conversely, movement of the servo to increase the fuel supply and the torque of the prime mover is accompanied by reverse or clockwise turning of the lever 46 and raising of the plug 43 to reduce the speeder spring force applied to the flyballs so that the latter will center at a lower speed. Such progressive readjustment of the counteracting force on the flyballs produces the speed droop characteristic $a$. The ratio of transmission of the servo motion and therefore the amount of the speed droop $a$ may be varied as desired by adjusting the length of the short end portion of the lever 46 which, for this purpose, is made in two parts clamped together by a screw 54 on one part extending through a slot in the other part, the pivot 47 supporting the former part.

To increase the speed droop substantially as indicated at $b$ (Fig. 4), provision is made for effecting a substantially greater reduction in the force counteracting the flyball force when the fuel rod 5 reaches a predetermined position, this being accomplished through the medium of spring means of higher scale or greater stiffness than the primary spring force through which the speed droop $a$ is obtained. In the present instance an auxiliary spring 55 of substantially higher scale than the spring 42 is employed and maintained ineffectual during the major portion of the load range but rendered active when the servo piston 26 reaches a predetermined position. Thereupon, the spring force is applied to the flyballs 8 in opposition to the force of the spring 42 producing a decrease in the resultant force on the flyballs which decreases at an increased rate in the continued movement of the fuel rod.

Herein, the auxiliary spring is of the coiled compression type being shorter and formed from somewhat stiffer wire than the main spring 42 so as to possess the desired higher scale to the spring. To associate the spring with the flyballs, one end bears against an adjustable abutment 56 on the upper end of a rod 57 which extends down through the spring 55, the plug 43, and the main spring 42. A head 58 on the lower end of the rod is disposed within and has a lost motion connection with the valve rod head 20 and is adapted, when the rod is raised from the position shown in Fig. 1, to engage an inturned shoulder 59 on the valve rod.

The lower end of the spring 55 rests on an abutment 60 which, in accordance with the present invention, is shiftable axially of the spring axis to render the spring 55 active and inactive in response to movement of the servo piston. Herein, the abutment 60 is formed intermediate the ends of a lever 61 fulcrumed at one end on a pin 62 which is supported by the governor casing. At the other end, the lever carries a vertically adjustable screw 63 positioned for engagement at its lower end by a rounded upwardly facing surface 64 on top of the bell crank arm 28 between the pivot 30 and the piston rod 27. At a predetermined point in the upward or fuel-increasing movement of the servo piston 26, the surface 64 engages the screw 63 and raises the lever 61 in unison with the further upward movement of the servo. The normal position of the lever and, therefore, the point at which the lever is picked up by the servo may be varied by adjustment of the screw 63 and also of a screw 65 which threads through the lever and bears against an end portion 66 of the governor casing.

To enable the point $c$ at which the amount of speed droop is changed to be varied in predetermined steps and thus produce the characteristic $e$, provision is made for changing the normal position of the lever 61 by a predetermined increment, the change preferably being controllable selectively from a point remote from the governor. Herein, this is accomplished by shifting the position of the lever fulcrum 62 parallel to the axis of the spring 55 by an amount corresponding to the change desired in the position of the high droop portion speed droop characteristic. For this purpose, the fulcrum 62 is carried by a plunger 68 slidable in a guide 69 urged by a spring 70 into the position shown in Fig. 1. This position is determined by engagement of a head 71 on the upper end of the plunger 68 with a stop screw 72 (Fig. 3) threading through the end of a casing 73 which is carried by the cover of the governor housing 6.

The plunger head 71 forms the armature of a solenoid 74 disposed within the casing 73 and adapted when energized to draw the armature downwardly away from the stop 72 and thus lower the fulcrum 62 to the position shown in Fig. 3. This lowers the abutment 60 of the auxiliary spring so that an additional movement of the servo actuated part 64 as indicated at $x$ in Fig. 3 is required before the lever 61 is picked up and moved in the fuel-increasing movement of the servo.

Assuming that the solenoid 74 is deenergized and that the engine controlled by the governor is operating under a relatively light load, the parts may be positioned as shown in Fig. 1 with the fulcrum 62 disposed in its upper position. At this time, the servo piston 26 moves up and down as the engine speed decreases and increases respectively, and the primary speed droop mechanism including the lever 46 operates in the manner previously described to impart the drooping characteristic $a$ to the engine. At this time, the auxiliary spring 55 is inactive and the centrifugal force on the flyballs 8 is opposed by the main spring 42 alone owing to the lost motion provided between the valve stem and the rod 57.

Now, as the load on the engine is increased, the fuel rod 5 is moved in the speed-increasing direction and the engine speed decreases along the curve a until the bell crank 29 encounters the end 63 of the lever 61 and initiates upward movement of the lever and the anchor 60 of the spring 55. In the initial part of this movement, the lost motion between the rod 57 and the valve stem is taken up whereupon the upper abutment 56 on the rod becomes rigid with the valve stem so that the motion of the lever 61 compresses the spring 55. This results at the point c in the application of the spring force to the rod 57 in an upward direction and therefore to the flyballs 8 in a direction opposite to the force exerted on the latter by the main spring 42. As the movement of the servo continues as shown in Fig. 2, the spring 55 is compressed progressively thereby increasing the force which it exerts on the flyballs.

Since the spring 55 has a higher scale (for example 350 pounds per inch as compared to 33 pounds per inch for the spring 42), its force is increased more rapidly in the continued movement of the servo piston than the force of the spring 42 is decreased by movement of the speed droop lever 46 in the same servo motion. The force thus resulting from the combined effects of the two springs decreases progressively with the servo motion, and, for a given servo movement, the change is substantially greater than the force change by the main spring 42 alone. Thus, the slope of the speed droop curve is increased as indicated at b which is advantageous in enabling additional fuel to be metered to the engine and therefore added torque to be derived without danger of loading the engine excessively.

Under certain conditions of operation of a diesel engine, it may be desirable to extend the curve a beyond the point c and thus increase the speed droop at a higher torque value such as at d. This may be accomplished by energizing the solenoid 74 which lowers the plunger 71 and the lever fulcrum 62 to the positions shown in Fig. 3. A greater fuel-increasing movement of the servo piston is then required before the lever 61 is picked up and the force of the spring 55 becomes applied to the flyballs. As a result, the curve a is extended to the point d beyond which the engine operates with a high speed droop along the curve e.

Whenever the servo piston moves downwardly or in the fuel-decreasing direction beyond the position at which the screw 65 again comes against the stop 66 as shown in Fig. 1, the spring 55 will become fully expanded and the application of its force to the flyballs will be interrupted. The amount of speed droop is thus reduced, the engine then operating on the curve a.

With the arrangement described above, it is possible to provide for a wide change in the speed droop characteristic without danger of inducing self-excited and false oscillations in the governor and producing a resultant instability in the engine operation. This is achieved by increasing the scale of the governor speeder spring in the high droop portion of the operating range and, in the present instance, by making the auxiliary spring 55 substantially stiffer than the main spring which alone is effective in the lower part of the operating range wherein high sensitivity of the governor is achieved by employing a speeder spring of low scale.

I claim as my invention:

1. The combination of, a power servo, a regulating member actuated thereby, a speed responsive governor controlling the energization of said servo to cause movement of said member in accordance with detected speed changes, said governor having a rotary flyweight and a spring counteracting the centrifugal force thereon, an operative connection between said spring and member for transmitting the movement of said member to said spring to impart a speed droop characteristic to said governor, an auxiliary spring of higher scale than said first spring, a lever normally held in a predetermined position and operable when swung about its fulcrum away from said position to couple said auxiliary spring to said flyweight in a direction to decrease the force of said first spring and then increase the force of the auxiliary spring progressively in the further movement of the lever, mechanism providing a lost motion connection between said lever and said member and operable after a predetermined fuel-increasing movement of the member to move said lever away from said predetermined position, and selectively operable means for changing the position of the fulcrum of said lever whereby to correspondingly change the point in the motion of said member at which the lever is actuated by said connection.

2. The combination of, a power servo, a regulating member actuated thereby, a speed responsive governor controlling the energization of said servo to cause movement of said member back and forth in accordance with detected speed changes, said governor having a rotary flyweight and a spring counteracting the centrifugal force on said flyweight, an operative connection for transmitting the movement of said member to said spring to decrease and increase the loading thereof as the member moves in the fuel-increasing and fuel-decreasing directions respectively, an auxiliary spring of higher scale than said spring operatively connected at one end to said flyweight, a shiftable anchor connected to the other end of said auxiliary spring and movable away from a normally inactive position to render the auxiliary spring active in applying its force to said flyweight in a direction to decrease the loading of said flyweight, a lost motion connection between said member and said spring anchor operable at a predetermined point in the fuel-increasing movement of the member to pick up said anchor and apply the force of said auxiliary spring to said flyweight and then increase the force of the auxiliary spring progressively as the movement of said member continues, and means selectively operable to change the normal position of said spring anchor whereby to vary the position in the movement of said member at which said auxiliary spring is rendered operative.

3. The combination of, a servo actuated member, a speed responsive governor regulating the actuation of said member in response to speed changes, said governor having a rotary flyweight and a main spring counteracting the centrifugal force thereon, means connecting said spring and said member for transmitting the motion of said member to said main spring to vary the effective loading thereof and impart a speed droop characteristic to the governor, an auxiliary spring associated with said flyweight, mechanism operable in the movement of said member beyond a predetermined position to connect said auxiliary spring to said flyweight and combine the force thereof to change said speed droop characteristic, and means selectively operable to adjust said mechanism and vary the position at which said auxiliary spring is rendered active in the movement of said member.

4. The combination of a power servo, a member movable by said servo, a speed responsive governor controlling the energization of said servo to cause movement of said member in accordance with detected speed changes, said governor having a rotary flyweight and a spring counteracting the centrifugal force thereon, an operative connection transmitting the movement of said member to said spring to impart a speed droop characteristic to said governor, an auxiliary spring of higher scale than said first spring, a lever normally held in a predetermined position and operable when swung about its fulcrum away from said position to couple said auxiliary spring to said flyweight in a direction to decrease the force of said first spring and then increase the force of the auxiliary spring progressively in the further movement of the lever, and mechanism providing a lost motion connection between said lever and said member and operable after a predetermined fuel-increasing movement of the member to move said lever away from said predetermined position.

5. The combination of, a regulating member, a power servo for actuating said member, a speed responsive governor controlling the energization of said servo to cause movement of said member back and forth in accordance with detected speed changes, said governor having a rotary flyweight and a spring counteracting the centrifugal force acting thereon, means for transmitting the movement of said member to said spring to decrease and increase the loading thereof as the member moves in the fuel-increasing and fuel-decreasing directions respectively, an auxiliary spring of higher scale than said first spring operatively, an operative connection between said auxiliary spring and said flyweight normally maintained inactive, and mechanism actuated by movement of said member and operable at a predetermined point in the fuel-increasing movement thereof to render said connection active and apply the force of said auxiliary spring to said flyweight and then increase the effective force of the auxiliary spring progressively as the movement of said member continues.

6. The combination of, a servo actuated member, a speed responsive governor regulating the actuation of said member in response to speed changes, said governor having a rotary flyweight and a main speeder spring acting thereon, an auxiliary spring stiffer than said main spring, a lever connected to said auxiliary spring and holding the latter inactive while the lever is disposed in a predetermined position, a connection between said auxiliary spring and said flyweight rendered operative when the lever is swung away from such position to apply the force of said auxiliary spring to said flyweight in opposition to said main spring and then increase the effective force of the auxiliary as the movement of said member continues, and means providing a lost motion connection for transmitting the movement of said member to said lever.

7. The combination of, a servo actuated member, a speed responsive governor regulating the actuation of said member in response to speed changes, said governor having a rotary flyweight and a main spring counteracting the centrifugal force thereon, means for transmitting the motion of said member to said spring to vary the counteracting force thereof and thereby impart speed droop to said governor, an auxiliary spring associated with said flyweight, a normally inactive connection between said auxiliary spring and said flyweight, and mechanism operable in the movement of said member beyond a predetermined position to render said connection active to transmit the force of said auxiliary spring to said flyweight in opposition to said main spring and then increase the effective force of the auxiliary spring as the movement of said member continues, said auxiliary spring having a higher scale than said main spring.

8. The combination of, a servo actuated member, a speed responsive governor regulating the actuation of said member in response to speed changes, said governor having a rotary flyweight and a main spring counteracting the centrifugal force thereon, means for transmitting the motion of said member to said spring to reduce the effective force of the latter as the member moves in the torque-increasing direction whereby to impart speed droop to said governor, an auxiliary spring associated with said flyweight, a connection between said auxiliary spring and said flyweight, and mechanism normally maintaining said connection inoperative in the lower portion of the load range of the governor and operable by said member at a predetermined position in the torque-increasing movement of the latter to render said connection active and apply the force of said auxiliary spring to said flyweight in a direction to increase the amount of said speed droop.

9. The combination of, a servo actuated member, a speed responsive governor regulating the actuation of said member in response to speed changes, said governor having a rotary flyweight and spring constantly acting on the flyweight to counteract the centrifugal force thereon, a connection between said member and said spring continuously transmitting the motion of said member to said spring means to vary the effective loading thereof and impart a speed droop characteristic to the governor, a movable element normally disposed in a predetermined position and having a lost motion connection with said member so as to be moved out of said position after the lost motion has been taken up, a normally inactive second spring of different stiffness than said first spring, and means including a lost motion connection joining said second spring and said element and acting, after the lost motion has been taken up in the latter connection, to combine the force of said second spring with said first spring and thereby vary the loading of said flyweight.

GEORGE E. PARKER.

REFERENCES CITED

The following references are of record in the file of this patent:

UNITED STATES PATENTS

| Number | Name | Date |
|---|---|---|
| 2,364,116 | Whitehead | Dec. 5, 1944 |
| 2,371,157 | Drake | Mar. 13, 1945 |
| 2,378,558 | Kalin | June 19, 1945 |
| 2,421,497 | Grieshaber et al. | June 3, 1947 |
| 2,452,088 | Whitehead | Oct. 26, 1948 |